(12) United States Patent
Kubo

(10) Patent No.: US 8,259,150 B2
(45) Date of Patent: Sep. 4, 2012

(54) IMAGE FORMING APPARATUS

(75) Inventor: Isao Kubo, Tokoname (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 358 days.

(21) Appl. No.: 12/724,552

(22) Filed: Mar. 16, 2010

(65) Prior Publication Data

US 2010/0245520 A1    Sep. 30, 2010

(30) Foreign Application Priority Data

Mar. 31, 2009    (JP) ................................ 2009-088397

(51) Int. Cl.
*B41J 27/00* (2006.01)
*B41J 2/385* (2006.01)
*B41J 2/47* (2006.01)
*B41J 2/435* (2006.01)

(52) U.S. Cl. ......... 347/261; 347/132; 347/237; 347/247

(58) Field of Classification Search .................. 347/261, 347/237, 247
See application file for complete search history.

(56) References Cited

U.S. PATENT DOCUMENTS

| 6,476,370 | B1 | 11/2002 | Suzuki et al. |
| 7,327,378 | B2 * | 2/2008 | Han et al. ...................... 347/243 |
| 2005/0218845 | A1 | 10/2005 | Okamoto |

FOREIGN PATENT DOCUMENTS

| JP | H11-258530 | A |   | 9/1999 |
| JP | 2001-174728 | A |   | 6/2001 |
| JP | 2002-258182 | A |   | 9/2002 |
| JP | 2005-287206 | A |   | 10/2005 |
| JP | 2006-289746 | A |   | 10/2006 |
| JP | 2006289746 | A | * | 10/2006 |
| JP | 2007-062266 | A |   | 3/2007 |
| JP | 2007062266 | A | * | 3/2007 |

OTHER PUBLICATIONS

Japan Patent Office, Notification of Reasons for Refusal for Japanese Patent Application No. 2009-088397 (counterpart to above-captioned patent application), dispatched Mar. 15, 2011.

* cited by examiner

*Primary Examiner* — Stephen Meier
*Assistant Examiner* — Sarah Al Hashimi
(74) *Attorney, Agent, or Firm* — Baker Botts L.L.P.

(57) ABSTRACT

An image forming apparatus includes: a light source that emits a light beam; a photosensitive member; a driving motor; a rotary polygon mirror, which is rotated by the driving motor, and which periodically deflects the light beam emitted from the light source to sequentially form scanning lines on the photosensitive member; a position detecting unit, which detects a rotational position of the driving motor, and which outputs a detection signal; a sensor, which receives the light beam deflected by the rotary polygon mirror, and which outputs a light receiving signal; a detecting unit, which receives the detection signal and the light receiving signal, and which detects a rotation direction of the driving motor based on a timing pattern of a detection of the rotational position of the driving motor and a reception of the light beam by the sensor.

12 Claims, 7 Drawing Sheets

IMAGE FORMING APPARATUS

CROSS-REFERENCE TO RELATED APPLICATIONS

This application claims priority from Japanese Patent Application No. 2009-088397 filed on Mar. 31, 2009, the entire subject matter of which is incorporated herein by reference.

TECHNICAL FIELD

The present invention relates to an image forming apparatus, and more particularly to a driving motor for rotating a rotary polygon mirror.

BACKGROUND

Some image forming apparatuses that form an image electrophotographically include an optical scanning mechanism having a rotary polygon mirror that deflects a light beam emitted from a light source to illuminate a photosensitive member. There has been proposed a known image forming apparatus including a driving motor for rotating a rotary polygon mirror, such as a brushless motor, and a plurality of Hall elements. In the known image forming apparatus, the rotation of the brushless motor is controlled while the position of the rotor is detected on the basis of signals output from the Hall elements.

SUMMARY

Illustrative aspects of the invention provide an image forming apparatus that is capable of detecting rotation direction of a driving motor.

DETAILED DESCRIPTION

General Overview

Figure 1:
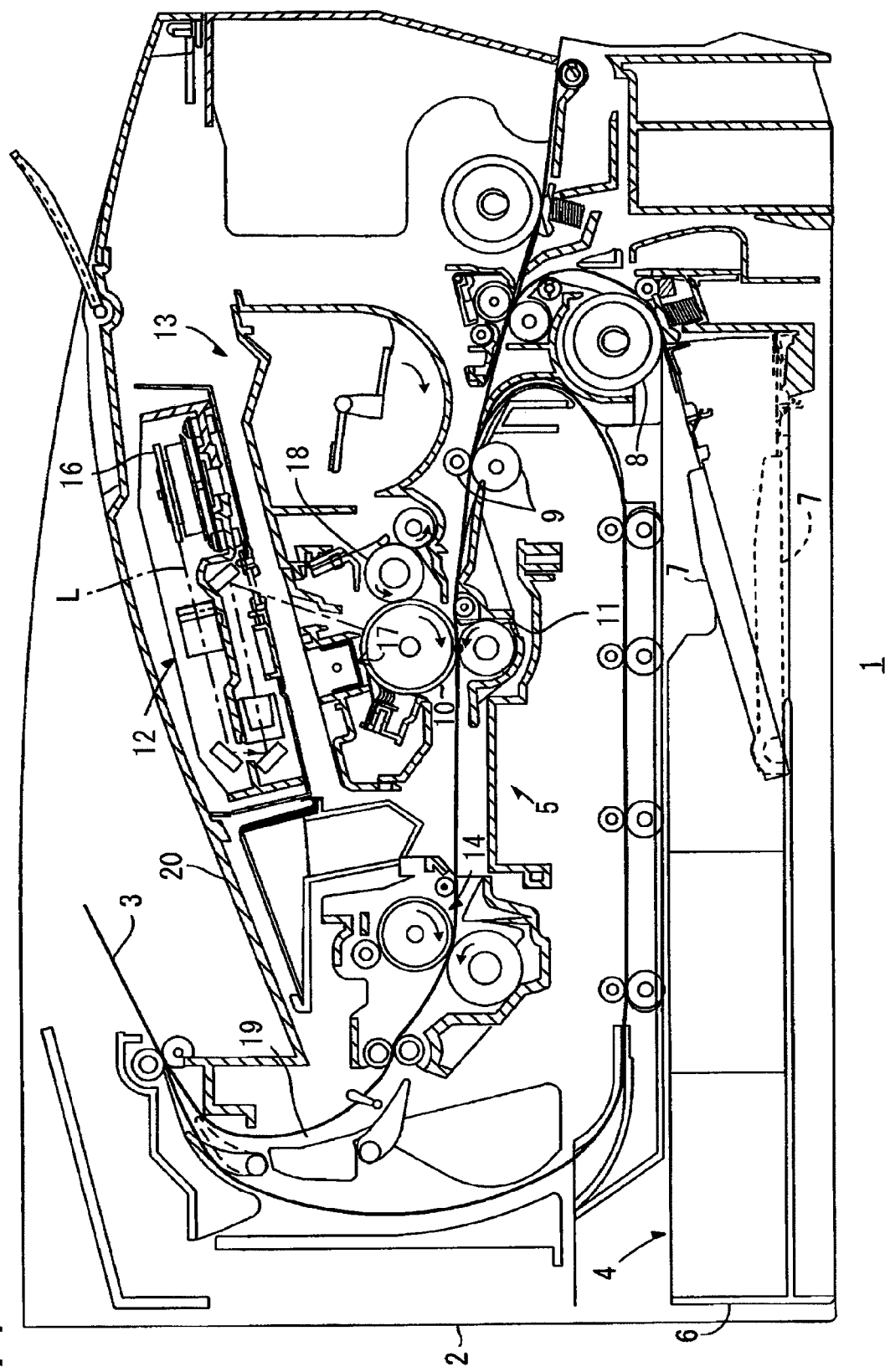
FIG. 1 is a schematic side sectional view of an image forming apparatus according to an exemplary embodiment of the invention.

A driving motor sometimes rotates in a direction opposite to a desired direction. However, the known image forming apparatus is unable to detect the rotation direction of a driving motor.

Therefore, illustrative aspects of the invention provide an image forming apparatus that is capable of detecting rotation direction of a driving motor.

According to a first illustrative aspect of the invention, there is provided an image forming apparatus comprising: a light source that emits a light beam; a photosensitive member; a driving motor; a rotary polygon mirror, which is rotated by the driving motor, and which periodically deflects the light beam emitted from the light source to sequentially form scanning lines on the photosensitive member; a position detecting unit, which detects a rotational position of the driving motor, and which outputs a detection signal; a sensor, which receives the light beam deflected by the rotary polygon mirror, and which outputs a light receiving signal; a detecting unit, which receives the detection signal and the light receiving signal, and which detects a rotation direction of the driving motor based on a timing pattern of a detection of the rotational position of the driving motor and a reception of the light beam by the sensor.

The light receiving cycle of the sensor may be sometimes varied by, for example, placement dispersion of mirror surfaces of the rotary polygon mirror. Therefore, the timing pattern of the detection of the rotational position of the driving motor and the light reception of the sensor is usually different depending on the rotation direction of the rotor. Consequently, according to the illustrative aspect of the invention, the rotation direction of the driving motor can be detected on the basis of the timing pattern.

According to a second illustrative aspect of the invention, in the image forming apparatus, the detecting unit detects the rotation direction by comparing a time difference between a detection timing of the rotational position and a light receiving timing of the sensor with a reference time period.

According thereto, when the time difference between the detection timing of the rotational position and the light receiving timing of the sensor is compared with the reference time period, the rotation direction of the driving motor can be accurately detected.

According to a third illustrative aspect of the invention, in the image forming apparatus, wherein a number of surfaces of the rotary polygon mirror is equal to a half of a pole number of magnets of the driving motor.

According thereto, the rotation direction of the driving motor can be detected based on the time difference between one detection timing of the rotational position and one light receiving timing of the sensor.

According to a fourth illustrative aspect of the invention, in the image forming apparatus, wherein the reference time period comprises: a first-direction reference time period corresponding to a time difference in a case where the driving motor rotates in a first direction; and a second-direction reference time period corresponding to a time difference in a case where the driving motor rotates in a second direction, and wherein the detecting unit detects the rotation direction by comparing a current time difference with the first-direction reference time period and the second-direction reference time period.

According thereto, it is possible to promptly detect which direction the driving motor rotates.

According to a fifth illustrative aspect of the invention, in the image forming apparatus, wherein the reference time period is a first-direction reference time period corresponding to a time difference in a case where the driving motor rotates in a first direction, and wherein the detecting unit detects the rotation direction by comparing a current time difference with the first-direction reference time period.

According thereto, even when the second-direction reference time period corresponding to the time difference in the case where the driving motor rotates in the second direction is not stored, it is possible to detect which direction the driving motor rotates. Preferably, "first direction" is the normal rotation direction of the driving motor because of the following reason. Usually, it is supposed that the driving motor rotates in the normal rotation direction. Therefore, it is requested only to compare the current time difference with the first-direction reference time period to determine whether the both coincide with each other or not. It is highly possible that the rotation direction of the driving motor can be promptly detected.

According to a sixth illustrative aspect of the invention, in the image forming apparatus, wherein the driving motor is a brushless motor comprising a stator where a plurality of coils are placed and a rotor where a plurality of magnets are placed, wherein the position detecting unit outputs the detection signal based on induced voltages generated in the coils by rotation of the rotor, and wherein the image forming apparatus further comprises: an energization switching unit that turns on and off energizations of the coils; and an on/off controlling unit that controls turning on/off of the energizations by the energization switching unit based on the detection signal.

In the image forming apparatus of the invention, the rotation of the brushless motor is controlled on the basis of the induced voltages generated in the coils. In such a configuration, the brushless motor tends to rotate in a direction opposite to a desired direction. Therefore, the sixth illustrative aspect of the invention is particularly effective.

According to a seventh illustrative aspect of the invention, the image forming apparatus further comprises: a light emission controlling unit that reverses a light emission pattern of the light source for forming the scanning lines depending on the rotation direction detected by the detecting unit.

According thereto, a substantially identical image can be formed even when the driving motor rotates in any direction.

According to an eighth illustrative aspect of the invention, in the image forming apparatus, wherein the light emission controlling unit executes an operation in a pattern reversed to the light emission pattern when predetermined conditions are satisfied.

According thereto, the execution of the operation in the pattern reverse to the light emission pattern can be determined depending on the predetermined conditions.

According to a ninth illustrative aspect of the invention, in the image forming apparatus, wherein the detecting unit detects the rotation direction by comparing the timing pattern with a reference pattern.

According to a tenth illustrative aspect of the invention, in the image forming apparatus, wherein the reference pattern comprises: a first-direction reference pattern corresponding to a timing pattern in a state where the driving motor rotates in a first direction; and second-direction reference pattern corresponding to a timing pattern in a state where the driving motor rotates in a second direction, and wherein the detecting unit detects the rotation direction by comparing the timing pattern with the first-direction reference pattern and the second-direction reference pattern.

According to an eleventh illustrative aspect of the invention, in the image forming apparatus, wherein the reference pattern is prepared on the basis of a timing pattern that is experimentally measured in a state where the polygon mirror is stably rotated within a target speed range.

According to a ninth illustrative aspect of the invention, the image forming apparatus further comprises: a memory that stores the reference pattern.

According to the illustrative aspects of the invention, it is possible to detect the rotation direction of a driving motor.

Exemplary Embodiments

Exemplary embodiments of the invention will now be described with reference to the Drawings.

(1) Image Forming Apparatus

As shown in FIG. 1, an image forming apparatus 1 includes, in a body frame 2, a feeder unit 4 that feeds a sheet 3 such as a recording sheet, an image forming unit 5 that forms an image on the sheet 3, etc. Incidentally, a laser printer is one example of the image forming apparatus 1.

The image forming apparatus 1 may be a monochrome laser printer or a color laser printer using two or more colors. For example, the image forming apparatus may be a multi-function device having a facsimile function, a copy function, a reading function (scanner function) and the like, as far as the device has an image forming (printing) function.

The feeder unit 4 includes a tray 6, a pressing plate 7, a pickup roller 8 and a pair of registration rollers 9, 9. The pressing plate 7 is swingable about a rear end portion to press the uppermost one of sheets 3 on the pressing plate 7 toward the pickup roller 8. The sheets 3 are picked up one at a time by rotation of the pickup roller 8.

Then, the sheet 3 is registered by the registration rollers 9, 9 and is fed to the transferring position. The transferring position is a position where a toner image on a photosensitive member 10 is transferred to the sheet 3, and where the photosensitive member 10 contacts a transferring roller 11.

The image forming unit 5 includes a scanner unit 12, a process cartridge 13 and a fixing unit 14. The scanner unit 12 includes a light source 15 (see FIG. 3), a polygon mirror 16 (one example of a rotary polygon mirror), etc. A laser beam L (one example of a light beam) emitted from the light source 15 illuminates the surface of the photosensitive member 10 while being periodically deflected by the polygon mirror 16. The scanner unit 12 will be described later in detail.

The process cartridge 13 includes the photosensitive member 10, a scorotron-type charger 17 and a developing roller 18. The charger 17 uniformly charges the surface of the photosensitive member 10 to a positive polarity. The charged surface of the photosensitive member 10 is exposed to the laser beam L from the light source 15 to form an electrostatic latent image. Then, toner carried on the surface of the developing roller 18 is supplied to the electrostatic latent image formed on the photosensitive member 10, and toner image is developed thereon. Then, the toner image is transferred from the photosensitive member 10 to the sheet 3 by using the transferring roller 11.

The sheet 3, on which the toner image is transferred, is fed to the fixing unit 14, and the toner is thermally fixed to the sheet. Then, the sheet 3 conveyed to a discharge path 19 and is discharged to a sheet discharge tray 20.

(2) Electrical Configuration of Image Forming Apparatus

Figure 2:
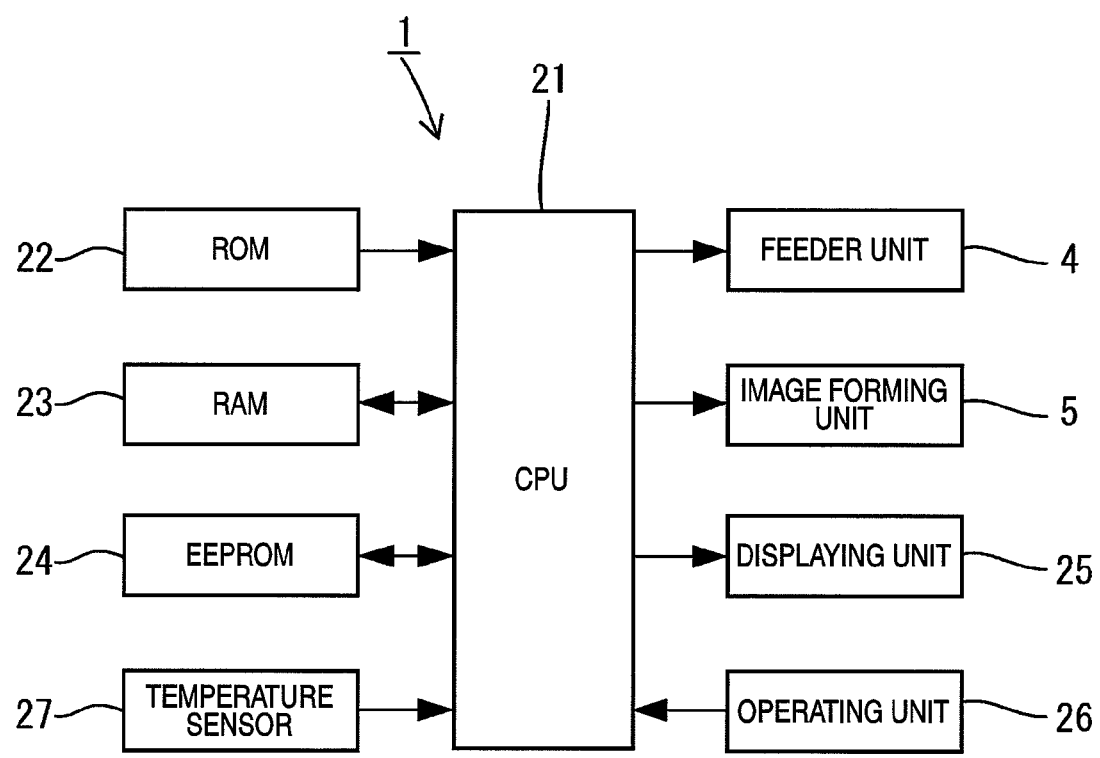
FIG. 2 is a block diagram exemplarily showing the electrical configuration of the image forming apparatus.

As shown in FIG. 2, the image forming apparatus 1 includes a CPU 21, a ROM 22, a RAM 23, an EEPROM 24 (one example of a memory unit), the feeder unit 4, the image forming unit 5, a displaying unit 25, which is configured by various lamps, a liquid crystal panel, and the like, an operating unit 26 such as an input panel, a temperature sensor 27, etc. In addition, the image forming apparatus 1 includes a network interface (not shown) through which the image forming apparatus 1 is connected to an external apparatus, etc.

(3) Scanner Unit

Figure 3:
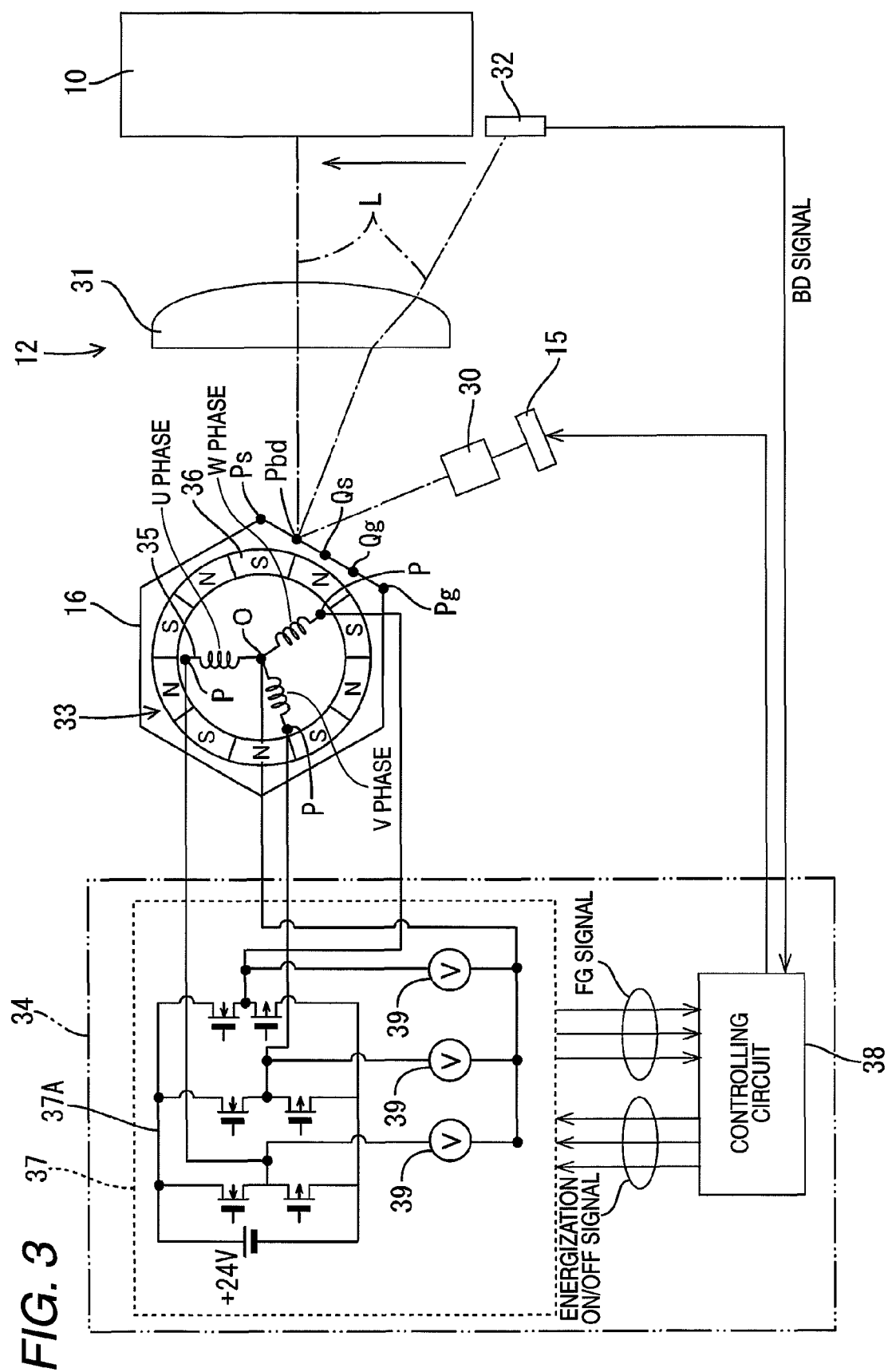
FIG. 3 is a diagram showing a scanner unit of the image forming apparatus.

As shown in FIG. 3, the scanner unit 12 includes the light source (i.e., a laser diode) 15 that emits the laser beam L, a first lens unit 30, the polygon mirror 16, a second lens unit 31, a light receiving sensor 32 (one example of a sensor), a brushless motor 33 (one example of a driving motor), a control circuit board 34, etc.

The first lens unit 30 is configured by a collimator lens, a cylindrical lens, and the like. The first lens unit 30 allows the laser beam L emitted from the light source 15 to pass therethrough to irradiate the polygon mirror 16. The second lens unit 31 is configured by an fθ lens, a cylindrical lens, and the like. The second lens unit 31 allows the laser beam L deflected (reflected) by the polygon mirror 16 to pass therethrough to irradiate the photosensitive member 10.

The polygon mirror 16 is configured by, for example, six mirror surfaces. The polygon mirror 16 is rotated at a high speed by the brushless motor 33. When rotated at a high speed, the polygon mirror 16 periodically deflects the laser beam L emitted from the light source 15, to sequentially form scanning lines on the photosensitive member 10 through the second lens unit 31. The scanning lines are dot-like exposure lines corresponding to line data of image data. In the case where line data correspond to a blank portion of an image, scanning lines are not formed.

The brushless motor 33 is a three-phase brushless DC motor. The brushless motor 33 has a stator 35, on which U-, V- and W-phase coils are arranged, and a rotor 36, on which field permanent magnets (in the exemplary embodiment, for example, ten poles) are arranged. In the brushless motor 33, the coils are arranged in star connection. The polygon mirror 16 is rotated integrally with the rotor 36.

On the control circuit board 34, a driving circuit 37 for rotating the brushless motor 33, a controlling circuit 38 (one example of an on/off controlling unit, a light emission controlling unit and a detecting unit), and the like are mounted. The driving circuit 37 includes, for example, an inverter 37A (one example of an energization switching unit) to turn on or off the energizations of the coils. The controlling circuit 38 is configured by, for example, an ASIC, and, based on instructions from the CPU 21, controls the light emission of the light source 15 and the rotation of the polygon mirror 16.

The light receiving sensor 32 is placed at a position where the laser beam L is received before the laser beam L deflected by the polygon mirror 16 reaches the photosensitive member 10. The light receiving sensor 32 is user for determining a timing of writing each scanning line with the laser beam L, receives the laser beam L emitted from the light source 15, and outputs a BD (Beam Detect) signal (one example of a light receiving signal) to the controlling circuit 38. Alternatively, the light receiving sensor 32 may be placed at a position where the laser beam L is received after the laser beam L passes through the photosensitive member 10.

(4) Configuration for Detecting Position of Rotor

The controlling circuit 38 detects the position of the rotor 36 without using a position detecting element such as a Hall element. That is, the controlling circuit 38 detects the position of the rotor 36 on the basis of the induced voltages that are generated in the coils in accordance with rotation of the rotor 36 with respect to the stator 35.

When the rotor 36 rotates, S- and N-pole magnets alternately approach (magnetize) each of the coils, magnetic fluxes in the coil are correspondingly changed, and the induced voltage is generated in the coil. The impedance of each coil is different depending on the polarity of the approaching magnet, i.e., the S-pole or the N-pole. Therefore, the induced voltage has a waveform (for example, a sinusoidal wave) that is periodically changed to different levels respectively corresponding to timings of approaches of the S-pole and the N-pole. Therefore, by detecting the induced voltage, it is possible to detect the position of the rotor 36 (i.e., the polarity of the magnet approaching each coil).

The configuration for detecting the induced voltage will be described. As shown in FIG. 3, the driving circuit 37 includes three voltage detecting circuits 39, 39, 39 (one example of a position detecting unit) respectively corresponding to the coils. Each of the voltage detecting circuits 39 outputs a detection signal corresponding to the voltage difference (including the induced voltage) between the end point P of the corresponding coil (i.e., the end of the coil on the side connected to the driving circuit 37) and the neutral point O of the star connection. The driving circuit 37 converts each of the detection signals to a high/low signal (hereinafter, referred to as an FG signal), the level of which is inverted in accordance with a change of the induced voltage (i.e., the switching of the polarity of the magnet approaching the coil) through, for example, a comparator (not shown), and supplies the signal to the controlling circuit 38.

Figure 4:
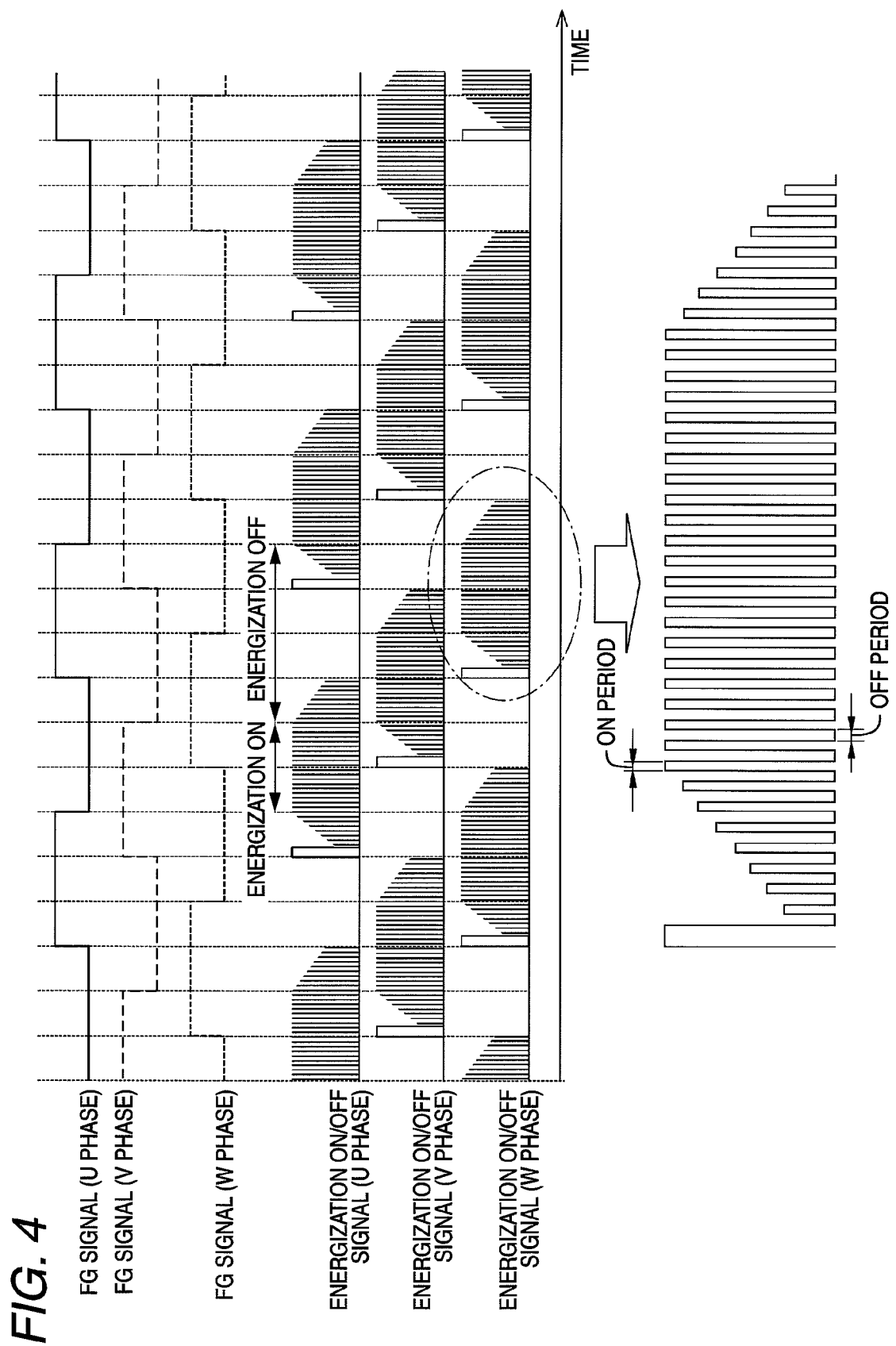
FIG. 4 is a time chart showing waveforms of FG signals and energization on/off signals.

As shown in FIG. 4, which is a time chart showing waveforms of the FG signals and energization on/off signals, the FG signals respectively corresponding to the phases are supplied to the controlling circuit 38 as waveforms in which the phases are shifted by about 120 deg. from one another. The controlling circuit 38 supplies the energization on/off signals respectively corresponding to the FG signals, to the driving circuit 37 to control the turning on/off of energizations of the coils. Therefore, the rotation of the brushless motor 33 can be controlled.

The controlling circuit 38 adjusts the current amount in the energization on time by, for example, the pulse width modulation, so that the rotation speed of the brushless motor 33 can be changed. As shown in FIG. 4, specifically, the controlling circuit 38 changes the PWM value (duty ratio) by performing the chopping control on the inverter 37A during the energization on time on the basis of PWM signals, thereby changing the rotation speed of the brushless motor 33.

The initial pulse of each of the PWM signals is set to be larger in at least one of pulse width and amplitude than the subsequent pulse group. Therefore, even in the initial stage of each energization on time, the brushless motor 33 can be smoothly rotated. In the subsequent pulse group, the amplitude is stepwise raised, and then stepwise lowered. Therefore, in on/off switching of energization, noise generation can be suppressed.

As shown in FIG. 3, the control circuit board 34 is placed at a position separated from the place where the brushless motor 33 (the polygon mirror 16) is installed, and connected to the brushless motor 33 through only four signal lines, which are connected to the three end points P of the coil, and the neutral point O, respectively.

(5) Control Process of Rotation of Brushless Motor

Figure 5A:
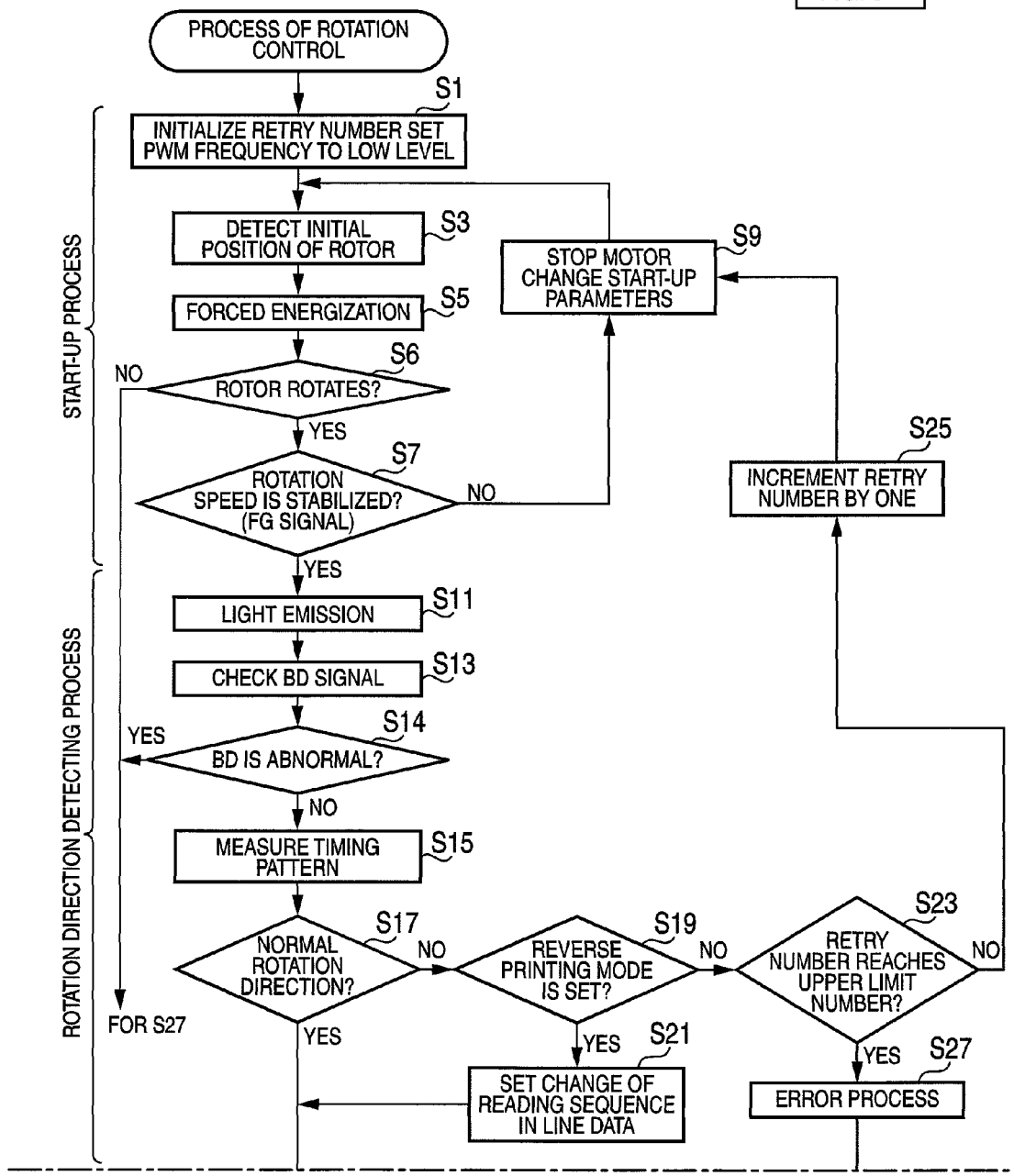
FIGS. 5A and 5B are flowcharts showing a rotation control process.
Figure 5B:
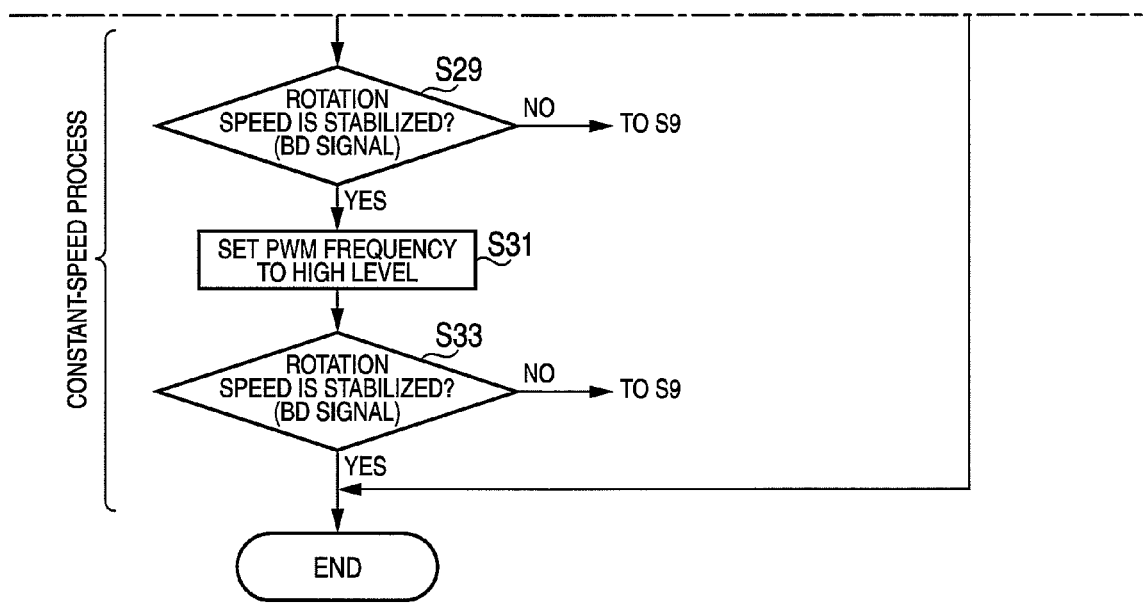

Referring to FIGS. 5A and 5B, a process of controlling the rotation of the brushless motor 33 will be described. When the controlling circuit 38 receives instructions for starting the rotation of the polygon mirror 16 from the CPU 21, the circuit executes the rotation control process shown in FIGS. 5A and 5B. In the rotation control process, a start-up process, a rotation direction detecting process, and a constant-speed process are sequentially executed.

(5-1) Start-Up Process

In the start-up process, first, the controlling circuit 38 initializes a retry number stored in, for example, the EEPROM 24 to zero, and sets the PWM frequency to a low level (for example, 125 [kHz]) (S1). The PWM frequency is the frequency of the pulses of the PWM signals, and equal to the frequency of the chopping control during the energization on time.

Next, the controlling circuit 38 detects the initial position (i.e., the stop position before the start up) of the rotor 36 (S3). Specifically, the circuit controls the driving circuit 37 so that currents flow through the coils, and the magnetic fluxes in the coils are changed. Based on the FG signals that are changed in accordance with the change, the initial position of the rotor 36 can be detected.

Next, the controlling circuit 38 executes forced energization (S5). Specifically, based on the result of the detection of the initial position, the controlling circuit 38 controls the driving circuit 37 so as to forcedly energize the coils by sequentially turning on and off the energizations of the coils, thereby attempting to rotate the rotor 36. If it is confirmed that the rotor 36 begins to be rotated on the basis of the FG signals (S6: YES), the position and rotation speed of the rotor 36 can be detected based on the FG signals because the induced voltages generated in the coils are reflected in the FG signals. If the rotation of the rotor 36 cannot be confirmed (S6: NO), the control proceeds to S27.

The controlling circuit 38 reads out the FG signals during the off period in the chopping control.

Then, the controlling circuit 38 supplies the PWM signals of the PWM frequency which is set to the low level in S1, to the driving circuit 37 to control the on/off of energizations of the coils, and executes the rotation speed control based on the FG signals, thereby attempting to perform full scale start-up of the brushless motor 33.

Next, the controlling circuit 38 determines whether the rotation speed of the brushless motor 33 is stabilized by the rotation speed control based on the FG signals or not (S7). Specifically, the rotation speed of the brushless motor 33 is detected on the basis of the on/off cycle of at least one (in the exemplary embodiment, one FG signal) of the three FG signals, and it is determined whether the detected rotation speed reaches a predetermined target speed range (for example, the difference with respect to 40,000 rpm is equal to smaller than a predetermined value) or not.

If the detected rotation speed is outside the range (S7: NO), it is determined that the rotation speed is unstable. In the case where the initial position of the rotor 36 is erroneously detected in S3, for example, the brushless motor 33 is not normally rotated after the forced energization in S5, the rotation speed becomes unstable, and the start-up operation is sometimes failed. In this case, the brushless motor 33 is stopped. For example, reverse currents are caused to flow to apply a breaking action on the brushless motor 33, and, when a state where the induced voltage is not detected is attained, the breaking action is cancelled. According to the configuration, the brushless motor 33 can be promptly stopped, and prepared for a retry operation.

Then, a part or all of start-up parameters (the frequencies of the energization on/off signals, the motor lead angle, and the PWM values (motor currents)) are changed (S9), and the control returns to S3 to retry the start up of the brushless motor 33. For example, the frequencies of the energization on/off signals, and the motor lead angle are increased (the timing of predictive energization is advanced), or the PWM values are enhanced to increase the starting current, thereby facilitating the start up of the brushless motor 33.

If the detected rotation speed is within the target speed range (S7: YES), it is determined that the rotation speed is stable, and the control process is transferred to the rotation direction detecting process.

(5-2) Rotation Direction Detecting Process

The controlling circuit 38 executes the rotation direction detecting process to detect whether the rotor 36 rotates in a direction corresponding to the scanning direction (main scanning direction) with respect to the photosensitive member 10 or not. At this time, the controlling circuit 38 functions as "detecting unit". Hereinafter, a rotation direction corresponding to the main scanning direction (i.e., direction of the arrow in FIG. 3) is referred to as "normal rotation direction", and a rotation direction opposite to the normal rotation direction is referred to as "reverse rotation direction".

In the rotation direction detecting process, the controlling circuit 38 controls the light source 15 so as to start the light emission (S11). Therefore, the light receiving sensor 32 periodically receives the laser beam L deflected by the polygon mirror 16, and outputs the BD signal in accordance with the light receiving timing.

Next, the controlling circuit 38 checks the BD signal (S13). Specifically, the controlling circuit determines whether the rotation speed of the polygon mirror 16 based on the cycle of the BD signal (hereinafter, the speed is sometimes referred to as the BD rotation speed) is within the target speed range or not. If it is determined that an abnormality such as that the BD signal cannot be detected, or that the BD rotation speed is unstable occurs (S14: YES), an error process (S27) such as stopping of the rotation control on the brushless motor 33, and displaying of information relating to the error is performed. By contrast, if it is determined that the process is normally performed (S14: NO), the control proceeds to S15.

Next, on the basis of the one FG signal and the BD signal that are received at this timing, the controlling circuit 38 measures the timing pattern of the detection of the induced voltage and the light reception of the light receiving sensor 32 (S15). The timing pattern is determined by the location relationship between the rotor 36 and the polygon mirror 16, and is different usually depending on the rotation direction. Therefore, based on the timing pattern, the rotation direction of the rotor 36 can be detected.

Specifically, a predetermined number (one or more) of the time differences between the change timing (the rising timing or the falling timing) of the FG signal and the change timing (the rising timing or the falling timing) of the BD signal are calculated. The calculated time differences are set as the timing pattern.

Figure 6:
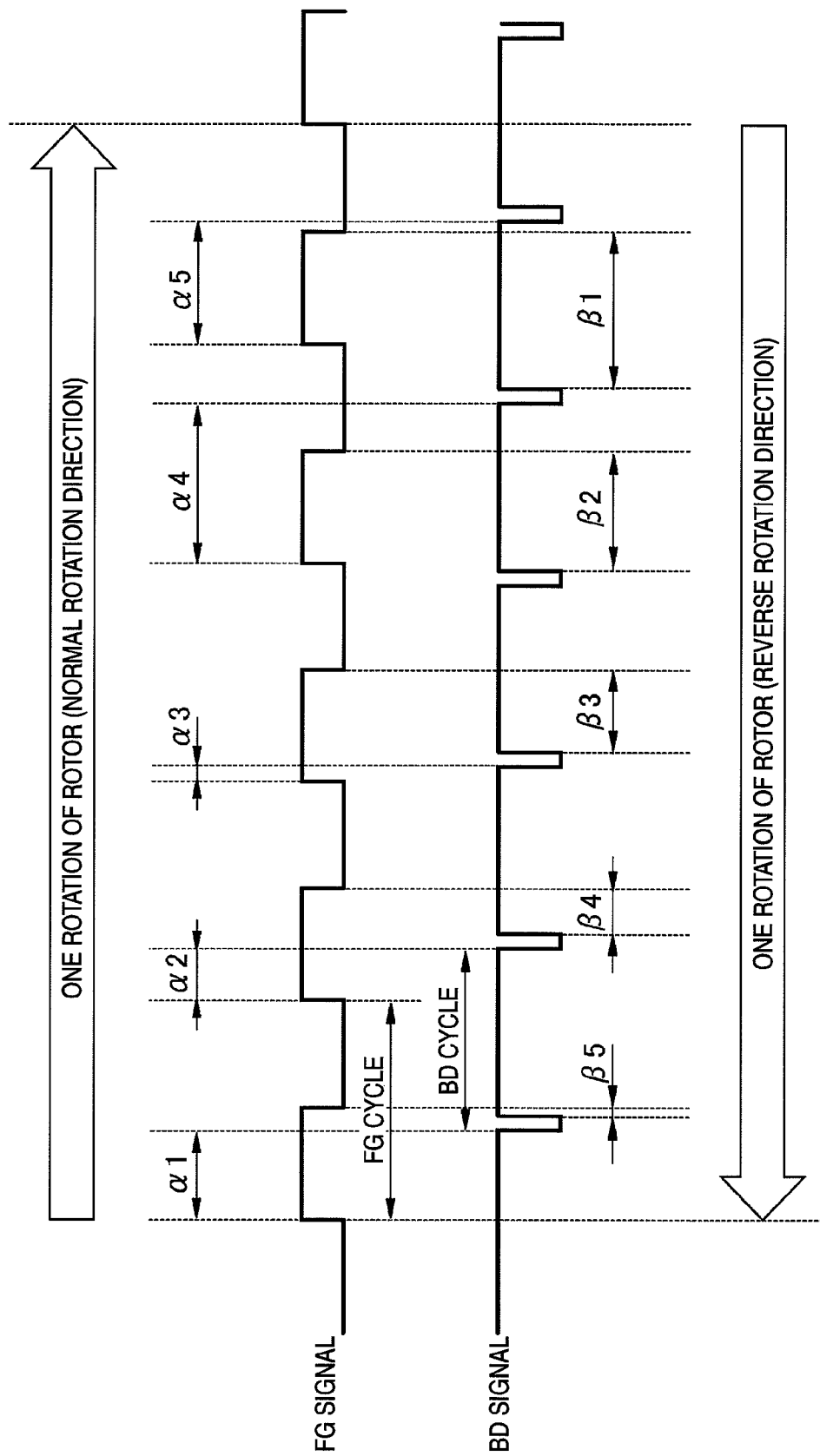
FIG. 6 is a time chart showing a timing pattern of detection of induced voltages and light reception of a light receiving sensor.

FIG. 6 is a time chart showing the timing pattern of detection of the induced voltages and light reception of the light receiving sensor 32. In the figure, $\alpha$ and $\beta$ indicate a time differences from the rising timing of the FG signal and to the falling timing of the BD signal, wherein $\alpha$ ($\alpha 1, \alpha 2, \alpha 3, \alpha 5$ and $\alpha 5$) indicates a time difference in the case where the rotor 36 rotates in the normal rotation direction (one example of a first-direction reference time period), and $\beta$ ($\beta 1, \beta 2, \beta 3, \beta 4$ and $\beta 5$) indicates a time difference in the case where the rotor 36 rotates in the reverse rotation direction (one example of a second-direction reference time period).

As shown in FIG. 6, in the case where the rotor 36 rotates in the normal rotation direction, the controlling circuit 38 periodically calculates the time difference in the sequence of $\alpha 1, \alpha 2, \alpha 3, \alpha 4$ and $\alpha 5$. By contrast, in the case where the rotor 36 rotates in the reverse rotation direction, the controlling circuit 38 periodically calculates the time difference in the sequence of $\beta 1, \beta 2, \beta 3, \beta 4$ and $\beta 5$.

On the other hand, for example, the EEPROM 24 previously stores reference pattern data. The reference pattern data include reference pattern data ($\alpha 1, \alpha 2, \alpha 3, \alpha 4, \alpha 5$) of the normal rotation direction (one example of a first-direction reference pattern) and reference pattern data ($\beta 1, \beta 2, \beta 3, \beta 4, \beta 5$) of the reverse rotation direction (one example of a second-direction reference pattern). Incidentally, the reference pattern data are prepared in production stage of the image forming apparatus 1 on the basis of a timing pattern that is experimentally measured in a state where the polygon mirror 16 is stably rotated within the target speed range.

The controlling circuit 38 compares the currently measured timing pattern with the reference pattern data (reference pattern), and, based on a result of the comparison, detects the rotation direction of the rotor 36 (S17). Specifically, when the measured timing pattern data coincide with the pattern data of the normal rotation direction, it is determined that the rotor rotates in the normal rotation direction, and, when the timing pattern data coincide with the pattern data of the reverse rotation direction, it is determined that the rotor rotates in the reverse rotation direction. If it is determined that the rotor rotates in the normal rotation direction (S17: YES), the control process is transferred to the constant-speed process.

If it is determined that the rotor rotates in the reverse rotation direction (S17: NO), it is determined whether a reverse printing mode is set or not (S19). In the reverse printing mode, even when the rotor 36 (the polygon mirror 16) is reversely rotated, an image in the same direction as the normal rotation is forcedly printed.

The reverse printing mode is set in such a case that the user inputs instructions through the operating unit 26, or that the temperature (ambient temperature) measured by the temperature sensor 27 disposed in the image forming apparatus 1 is equal to or lower than a predetermined temperature (one example of predetermined conditions), because of the following reason. In the case where the ambient temperature is low to some extent, there is a possibility that the lubricant in the brushless motor 33 hardens and the rotation cannot be smoothly controlled. When a retrying process (which will be described later) is performed under this situation, a long time period is required. This is not preferable.

If the reverse printing mode is set (S19: YES), the reading sequence in each line data of the image data is reversely set (S21), and the control process is transferred to the constant-speed process. Therefore, when the printing process is executed, the controlling circuit 38 controls the light emission of the light source 15 based on the line data in a pattern that is the reversal of that in the case where the polygon mirror 16 is rotated in the normal rotation direction. Even in the reverse rotation, an image, which is substantially identical with that in the normal rotation, can be forcedly printed. At this time, the controlling circuit 38 functions as "light emission controlling unit".

As shown in FIG. 3, in the case where the polygon mirror 16 is rotated in the normal direction (counterclockwise direction) and a latent image for one exposure line is formed on the photosensitive member 10, the starting point where one surface of the polygon mirror 16 is started to be illuminated with the laser beam L from the light source 15 is indicated by Ps, the point where the reflected light is received by the light receiving sensor 32 is indicated by Pbd, and the end point is indicated by Pg. In the one surface of the polygon mirror 16, the point illuminated with the laser beam L at the timing of starting the reading of line data is indicated by Qs, and the point illuminated with the laser beam L at the timing of ending the reading of line data is indicated by Qg. In the case where the polygon mirror 16 is rotated in the normal direction, the reading of line data is started after the time period required for the laser beam L to advance the length of the line segment PbdQs has elapsed from the light receiving timing of the light receiving sensor 32. By contrast, in the case where the polygon mirror 16 is rotated in the reverse direction, the reading of line data is started after the time period required for the laser beam L to advance the length of the line segment (PbdPs+PgQg) has elapsed from the light receiving timing of the light receiving sensor 32.

The controlling circuit 38 may be configured so that, in a process of expanding image data, a dot pattern, in which line data are expanded in the sequence reverse to that in the case of the normal rotation, is formed, and the light emission of the light source 15 is controlled in accordance with the dot pattern. Alternatively, the controlling circuit may be configured so that, when a dot pattern that has undergone a normal expanding process is to be read out, the reading is performed in the sequence reverse to that in the case of the normal rotation, and the light emission of the light source 15 is controlled in accordance with the dot pattern of the reverse sequence.

If it is determined in S19 the reverse printing mode is not set (S19: NO), the retrying process is performed. Specifically, it is determined whether the current retry number reaches the upper limit number or not (S23). If does not reach (S23: NO), the retry number is incremented by one (S25), the control process is returned to S9, and the processes subsequent to S9 are repeated.

If the current retry number reaches the upper limit number (S23: YES), the error process is executed (S27), and the rotation control process is ended.

(5-3) Constant-Speed Process

In the constant-speed process, the controlling circuit 38 switches the rotation speed control from one based on the FG signals to one based on the BD signal, and determines whether the rotation speed of the polygon mirror 16 is stable or not (S29). Specifically, the rotation speed of the polygon mirror 16 is detected on the basis of the on/off cycle of the BD signal, and it is determined whether the detected rotation speed is within the predetermined target speed range or not. If the detected rotation speed is outside the target-speed range (S29: NO), it is determined that the rotation speed is unstable, and the control process is returned to S9.

If the detected rotation speed of the polygon mirror 16 is within the target-speed range (S29: YES), it is determined that the rotation speed is stable, and the PWM frequency is switched to a high level (for example, 250 [kHz]) (S31). Based on the BD signal, then, it is again determined whether the rotation speed is within the predetermined target speed range or not (S33). If the detected rotation speed is outside the target-speed range (S33: NO), it is determined that the rotation speed is unstable, and the control process is returned to S9. By contrast, if the detected rotation speed is within the target-speed range (S33: YES), it is determined that the rotation speed is stable, and the rotation control process is ended, thereby completing the preparation for the printing process.

The image forming apparatus 1 according to the exemplary embodiment is configured so that attention is focused on the phenomenon that the induced voltages are generated in the coils by the rotation of the rotor 36 of the brushless motor 33, and the position of the rotor 36 is detected on the basis of the induced voltages. Therefore, the rotation control (including the rotation speed control) on the brushless motor 33 can be performed without using Hall elements.

Since Hall elements are not used, a phenomenon that uneven rotation is caused in a brushless motor by placement dispersion of Hall elements with respect to a rotor can be suppressed. Furthermore, the number of components can be reduced by the number corresponding to Hall elements, and hence the size reduction and cost reduction of the scanner unit 12 are enabled.

As a method detecting the induced voltages, for example, a method may be employed in which detection resistors are respectively connected between the end points P of the coils and the ground line, and the induced voltages are detected on the basis of the voltages of the detection resistors. However, in the method in which the induced voltages are detected on the basis of the potential differences between the neutral point O and the end points P as in the above-described exemplary embodiment, the induced voltages generated in the coils can be more accurately detected with using the potential of the neutral point as the common reference.

The image forming apparatus 1 according to the exemplary embodiment is configured such that the control circuit board 34 is placed at a position separated from the place where the brushless motor 33 is installed, and the driving circuit 37 and the controlling circuit 38 are disposed on the control circuit board 34. Therefore, as compared with a structure where the driving circuit 37 and the like are disposed on the side of the brushless motor 33, the size of the configuration in the vicinity of the brushless motor 33 can be reduced. Furthermore, the number of signal lines between the brushless motor 33 and the control circuit board 34 can be reduced as compared with the configuration where Hall elements are used.

The configuration where Hall elements are used has the following drawbacks. The Hall elements are inevitably disposed in the vicinity of the rotor 36, and hence may impede the size reduction of the brushless motor 33. The number of signal lines must be increased correspondingly with the number of the Hall elements. Since the output signal of a Hall element is weak, the rotation control on the brushless motor 33 is easily caused to become unstable by, for example, noises appearing in the signal lines. A Hall element is highly temperature dependent, and the amplitude of the output signal is particularly low in, for example, a high temperature. The output signal of a Hall element may not be detected on the side of the control circuit board 34, and may cause a failure of starting the brushless motor 33. By contrast, according to the exemplary embodiment of the invention, it is possible to overcome the drawbacks.

In the case where the chopping control is performed on the inverter 37A during the energization on time, a configuration where the FG signal is read during the on period in the chopping control may be possible. In the on period, noises are generated by a large current flowing through the coils, and there is a possibility that the detection of the induced voltage on the basis of the FG signals cannot be accurately performed because of the noises. Therefore, according to the exemplary embodiment, the FG signals are read during the off period in the chopping control.

In the starting of the brushless motor 33, however, a large current must be flown to the brushless motor, and hence the control is particularly susceptible to be affected by noises. Therefore, according to the exemplary embodiment, the PWM frequency is set to a low level during the starting period to prolong the off period, so that the FG signals can be accurately read, and, in the stabilized period, the frequency is set to a high level, so that the follow-up property of the rotation control in the brushless motor 33 is enhanced.

On the other hand, in the starting of the brushless motor 33, the polygon mirror 16 is rotated at a relatively low speed. Therefore, when the light source 15 emits the laser beam L, a specific portion of the photosensitive member 10 is illuminated for a long time period with the laser beam, and thus the photosensitive member 10 may be damaged. Therefore, according to the exemplary embodiment, the rotation speed control based on the BD signal is executed during the starting period, and, in the stabilized period, the control process is transferred to the rotation speed control based on the BD signal.

Preferably, as in the exemplary embodiment, it is confirmed that the brushless motor 33 performs stabilized rotation on the basis of the BD signal, and then the rotation speed control based on the FG signals is transferred to that based on the BD signal.

Moreover, in the exemplary embodiment, attention is focused on the phenomenon that the timing pattern of the detection of the rotational position of the brushless motor 33 and the light reception of the brushless motor 33 is different depending on the rotation direction of the rotor 36, and the rotation direction of the brushless motor can be detected on the basis of the timing pattern.

Moreover, the controlling circuit 38 compares the measured timing data with the pattern data in the normal rotation direction and those in the reverse rotation direction, and hence can correctly detect which direction the brushless motor 33 rotates.

In the case where it is detected that the brushless motor 33 rotates in the reverse direction, the controlling circuit 38 controls the light emission of the light source 15 on the basis of the line data in a pattern that is reversed to that in the case where the polygon mirror 16 is rotated in the normal rotation direction. Therefore, even in the reverse rotation, an image, which is substantially identical with that in the normal rotation, can be forcedly printed.

(6) Modification to Exemplary Embodiments

The invention is not limited to the above-described exemplary embodiments. For example, the following various embodiments are within the scope of the invention. Among the components of the exemplary embodiments, specifically, those other than the most significant components of the invention are additional components and hence may be adequately omitted.

In the above-described exemplary embodiment, The brushless motor is a three-phase outer-rotor type motor having star-connected coils. The invention is not limited thereto. For example, the phase number of the motor may be two, or four or more. An inner-rotor type motor may be employed, or a delta-connected motor may be used. In the case of the delta connection, on the base of the inter-terminal voltages of the coils, for example, a detection signal corresponding to the induced voltage can be obtained.

In the above-described exemplary embodiment, the polygon mirror 16 having six mirror surfaces, and the brushless motor 33 having ten poles are used. However, the invention is not limited thereto. A brushless motor having mirror surfaces, the number of which is other than six, or a brushless motor having a pole number that is other than ten may be employed. The minimum required number of the time difference data α, β in the rotation direction detecting process can be obtained from the surface number (N) of the polygon mirror, and the pole number (M) of the brushless motor. That is, the minimum ratio (A:B) of the surface number (N) to a half (M/2) of the pole number (M) is calculated, the smaller value (A or B) in the minimum ratio is the minimum required number. Therefore, in the case where the surface number (N) is equal to a half (M/2) of the pole number, the rotation direction can be detected from one set of time difference data.

In the above-described exemplary embodiment, the rotation speed of the brushless motor 33 is controlled by using the FG signals. However, the invention is not limited thereto. For example, a configuration may be employed where the number of rotations of the brushless motor 33 is monitored on the basis of the FG signals, and, under the conditions that the number of rotations reaches a reference number, various operations in the printing process such as that the light emission of the light source 15 is started, and that the sheet 3 is fed to the image forming unit 5 may be started. A configuration where timings of energizing the coils are controlled may be employed.

In the above-described exemplary embodiment, in the stabilized period, the control process is transferred to the rotation speed control based on the BD signal. Alternatively, the rotation speed control based on the FG signals may be continued. Incidentally, in the stabilized period, influences due to noises are relatively reduced, and hence it is preferable to raise the frequency so that the follow-up property of the rotation control in the brushless motor 33 is enhanced.

In the above-described exemplary embodiment, in the rotation control process, the PWM frequency is switched to a high level (S31) after it is confirmed that the rotation speed is stabilized based on the BD signal (S29 in FIG. 5B: YES). However, the invention is not limited thereto. After it is confirmed that the rotation speed is stabilized based on the FG signals (S7: YES), the PWM frequency may be switched to a high level. Incidentally, in terms of reliability, it may be preferable to switch the PWM frequency to a high level in accordance with the above-described exemplary embodiment.

In the above-described exemplary embodiment, the brushless motor 33 including no Hall element has been described. However, the invention is not limited thereto. A configuration where the position of the rotor is detected by using a position detecting element such as a Hall element may be employed. A brush-type motor may be used because, even in such a motor, reverse rotation may be caused by erroneous detection of the rotor position, brush displacement, or like.

What is claimed is:

1. An image forming apparatus comprising:
   a light source that emits a light beam;
   a photosensitive member;
   a driving motor;
   a rotary polygon mirror, which is rotated by the driving motor, and which periodically deflects the light beam emitted from the light source to sequentially form scanning lines on the photosensitive member;
   a position detecting unit, which detects a rotational position of the driving motor, and which outputs a detection signal;
   a sensor, which receives the light beam deflected by the rotary polygon mirror, and which outputs a light receiving signal;
   a detecting unit, which receives the detection signal and the light receiving signal, and which detects a rotation direction of the driving motor based on a timing pattern of a detection of the rotational position of the driving motor and a reception of the light beam by the sensor.

2. The image forming apparatus according to claim 1, wherein the detecting unit detects the rotation direction by comparing a time difference between a detection timing of the rotational position and a light receiving timing of the sensor with a reference time period.

3. The image forming apparatus according to claim 2, wherein a number of surfaces of the rotary polygon mirror is equal to a half of a pole number of magnets of the driving motor.

4. The image forming apparatus according to claim 2, wherein the reference time period comprises:
   a first-direction reference time period corresponding to a time difference in a case where the driving motor rotates in a first direction; and
   a second-direction reference time period corresponding to a time difference in a case where the driving motor rotates in a second direction, and
   wherein the detecting unit detects the rotation direction by comparing a current time difference with the first-direction reference time period and the second-direction reference time period.

5. The image forming apparatus according to claim 2, wherein the reference time period is a first-direction reference time period corresponding to a time difference in a case where the driving motor rotates in a first direction, and
   wherein the detecting unit detects the rotation direction by comparing a current time difference with the first-direction reference time period.

6. The image forming apparatus according to claim 1, wherein the driving motor is a brushless motor comprising a stator where a plurality of coils are placed and a rotor where a plurality of magnets are placed,
   wherein the position detecting unit outputs the detection signal based on induced voltages generated in the coils by rotation of the rotor, and
   wherein the image forming apparatus further comprises:
      an energization switching unit that turns on and off energizations of the coils; and
      an on/off controlling unit that controls turning on/off of the energizations by the energization switching unit based on the detection signal.

7. The image forming apparatus according to claim 1, further comprising:
   a light emission controlling unit that reverses a light emission pattern of the light source for forming the scanning lines depending on the rotation direction detected by the detecting unit.

8. The image forming apparatus according to claim 7, wherein the light emission controlling unit executes an operation in a pattern reversed to the light emission pattern when predetermined conditions are satisfied.

9. The image forming apparatus according to claim 1, wherein the detecting unit detects the rotation direction by comparing the timing pattern with a reference pattern.

10. The image forming apparatus according to claim 9, wherein the reference pattern comprises:
    a first-direction reference pattern corresponding to a timing pattern in a state where the driving motor rotates in a first direction; and
    a second-direction reference pattern corresponding to a timing pattern in a state where the driving motor rotates in a second direction, and
    wherein the detecting unit detects the rotation direction by comparing the timing pattern with the first-direction reference pattern and the second-direction reference pattern.

11. The image forming apparatus according to claim 9, wherein the reference pattern is prepared on the basis of a timing pattern that is experimentally measured in a state where the polygon mirror is stably rotated within a target speed range.

12. The image forming apparatus according to claim 9, further comprising:
    a memory that stores the reference pattern.

* * * * *